(12) United States Patent
Cho (10) Patent No.: US 7,492,699 B2
(45) Date of Patent: Feb. 17, 2009

(54) METHOD OF REDUCING FEEDBACK CHANNEL STATE INFORMATION WITHIN ADAPTIVE OFDMA SYSTEM AND ADAPTIVE OFDMA SYSTEM USING THE SAME

(75) Inventor: Myeongyun Cho, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 567 days.

(21) Appl. No.: 10/545,047

(22) PCT Filed: Feb. 9, 2004

(86) PCT No.: PCT/KR2004/000247

§ 371 (c)(1),
(2), (4) Date: Aug. 11, 2005

(87) PCT Pub. No.: WO2004/073200

PCT Pub. Date: Aug. 26, 2004

(65) Prior Publication Data

US 2006/0153060 A1    Jul. 13, 2006

(30) Foreign Application Priority Data

Feb. 11, 2003   (KR)   ...................... 10-2003-0008461

(51) Int. Cl.
*H04J 11/00*   (2006.01)
(52) U.S. Cl. ..................................... 370/203; 370/343
(58) Field of Classification Search .................. None
See application file for complete search history.

(56) References Cited

U.S. PATENT DOCUMENTS

| | | | | |
|---|---|---|---|---|
| 5,940,439 | A * | 8/1999 | Kleider et al. | ............... 375/225 |
| 6,163,766 | A | 12/2000 | Kleider et al. | |
| 6,542,610 | B2 * | 4/2003 | Traw et al. | .................. 380/262 |
| 2002/0085641 | A1 | 7/2002 | Baum | |
| 2005/0047346 | A1 * | 3/2005 | Terry et al. | .................. 370/236 |
| 2006/0205358 | A1 * | 9/2006 | Itoh et al. | ...................... 455/69 |

FOREIGN PATENT DOCUMENTS

| | | |
|---|---|---|
| JP | 8274744 | 10/1996 |
| KR | 1020040056976 A | 1/2004 |

* cited by examiner

*Primary Examiner*—Ajit Patel
(74) *Attorney, Agent, or Firm*—The Farrell Law Firm, PC

(57) ABSTRACT

A method of reducing channel state information fed back in an adaptive orthogonal frequency division multiple access system when transmitting and receiving data packets between a base station and a mobile station using an orthogonal frequency division multiplexing method comprising adaptive modulation and coding. The method includes: transmitting a data packet comprising information as to whether adaptive modulation and coding is on or off from the base station to the mobile station via a downlink; and tracking a modulation and coding scheme level only when it is determined that adaptive modulation and coding is performed based on the information as to whether adaptive modulation and coding is on or off and feeding back the channel state information obtained from the tracking result from the mobile station to the base station via an uplink.

28 Claims, 7 Drawing Sheets

METHOD OF REDUCING FEEDBACK CHANNEL STATE INFORMATION WITHIN ADAPTIVE OFDMA SYSTEM AND ADAPTIVE OFDMA SYSTEM USING THE SAME

TECHNICAL FIELD

The present invention relates to adaptive orthogonal frequency division multiple access (OFDMA).

BACKGROUND ART

Orthogonal frequency division multiplexing (OFDM) is used to reduce an inter-symbol interference (ISI) caused by multi-fading in a wireless communication environment. OFDM is used to divide a high-speed data stream into multiple low-speed sub data streams and carry the sub data streams over multiple sub-carriers. Since symbol durations of low-speed sub-carriers increase in OFDM, relative signal dispersion due to delay dispersion of a multi-path decreases. Guide intervals longer than delay dispersion of a channel are inserted into all OFDM symbols to remove ISI. Therefore, each sub-carrier band in OFDM can be assumed to be a flat attenuation channel.

U.S. Pat. No. 6,163,766 discloses an adaptive modulation technique. In the adaptive modulation technique, the number of allocated transmission bits of information for each sub-carrier is adjusted according to the conditions of a channel. When the channel is in a high-quality state, a large number of transmission bits are allocated for each sub-carrier, and when the state of the channel is poor, a small number of transmission bits are allocated or no data is transmitted.

U.S. Pat. No. 5,940,439 discloses an adaptive modulation and coding (AMC) technique. Two requirements should be satisfied to realize AMC for carrying a large amount of data over limited frequency sources. First, the state of a channel should be accurately estimated. Next, estimated channel state information (CSI) should be signaled without time delay or errors.

OFMD that is robust against multi-path fading and adaptive modulation, which adjusts the amount of allocated transmission bits of information according to the conditions of a channel, are combined into adaptive OFDM. In the adaptive OFDM, CSI should be fed back over each sub-carrier, and the amount of information fed back via uplink increases. In addition, since the characteristics of a channel temporally continuously vary in wireless communication, CSI accounts for a high percentage of the total transmitted information, which results in a waste of wireless channel resources.

In Internet-based next generation wireless communications, asymmetric duplexing at a ratio of 4:1 is used in frequency bands in downlink and uplink in consideration an increase in a necessary data rate in a forward link. An adaptive OFMD system should use a considerable portion of uplink resources to feed back CSI. When an uplink channel is in a poor state, information fed back to a transmitter is damaged, resulting in deteriorating communication performance.

A multiple antenna may be used to improve adaptive OFDM and spectral efficiency. When using the multiple antenna for OFDM, information regarding a spatial multiplexing (SM) scheme and a transmission scheme such as a transmit diversity (TD) scheme or the like should be transmitted along with information regarding a modulation and coding scheme (MCS) using a single antenna. Here, the SM scheme is to transmit different types of data to multiple transmitter antennas, respectively, in the high-quality states of channels to maximize a data transfer rate. In the TD scheme, the same data is coded to be suitable for a delay diversity concept, replicated as a plurality of data, and transmitted via multiple antennas.

In order to efficiently use the multiple antennas, signaling information should include information on a transmission scheme used for a transmitter antenna. In an MCS using a single antenna, three bits are generally allocated for MCS level information, while in an MCS using multiple antennas, one bit plus three bits is used to distinguish the SM scheme from the TD scheme.

Frequency selective fading may be serious due to a multi-path delay in an outdoor wireless communication environment. Thus, in the outdoor wireless communication environment, the number of sub-carriers should be increased so that each of the sub-carriers experiences uniform fading. Thus, the amount of CSI to be fed back to a transmitter increases with an increase in the number of sub carriers. Also, since a mobile station (MS) can change its position quickly, the characteristics of a channel vary frequently so that a period for feeding the CSI back is shortened. As a result, load on an uplink increases.

CSI is fed back via an uplink with a predetermined period of time. Thus, CSI may be unnecessarily fed back even when very short sub data frames requiring no feedback of CSI are transmitted via a downlink.

Wireless resources may be wasted in either a frequency division duplex (FDD) or a time division duplex (TDD) due to feedback CSI. More specifically, in the case of the TDD, a receiver should receive information regarding data modulation format information being transmitted from a transmitter as modulation level information (MLI). Thus, a large amount of additional information is necessary. Accordingly, a technique for reducing feedback CSI is required for the FDD and the TDD.

DISCLOSURE OF THE INVENTION

The present invention provides a method of reducing feedback CSI in an adaptive OFDMA system.

The present invention also provides an adaptive OFDMA system that performs the method of reducing feedback CSI.

According to an aspect of the present invention, there is provided a method of reducing channel state information fed back in an adaptive orthogonal frequency division multiple access system when transmitting and receiving data packets between a base station and a mobile station using an orthogonal frequency division multiplexing method comprising adaptive modulation and coding. The method includes: transmitting a data packet comprising information as to whether adaptive modulation and coding is on or off from the base station to the mobile station via a downlink; and tracking a modulation and coding scheme level only when it is determined that adaptive modulation and coding is performed based on the information as to whether adaptive modulation and coding is on or off and feeding back the channel state information obtained from the tracking result from the mobile station to the base station via an uplink.

According to another aspect of the present invention, there is provided a method of reducing feedback channel state information in an adaptive orthogonal frequency division multiple access system when transmitting and receiving data packets between a base station and a mobile station using an orthogonal frequency division multiplexing method comprising adaptive modulation and coding. The channel state information is fed back to the base station via an uplink and comprises 2 bits, one of which is a flag bit to track a modulation and coding scheme level in first and second tracking modes, the modulation and coding scheme level determining the state of a channel in a downlink.

According to still another aspect of the present invention, there is provided an adaptive orthogonal frequency division multiple access system to transmit and receive data packets between a base station and a mobile station using an orthogonal frequency division multiplexing method. The adaptive orthogonal frequency multiple access system includes: the base station comprising an AMC ON/OFF information generator that generates data packets comprising information as to whether adaptive modulation and coding is on or off; and the mobile station comprising AMC feedback information generator that, when it is determined, based on the information as to whether adaptive modulation and coding is on or off, that adaptive modulation and coding is on, estimates the state of a channel in a downlink, tracks a modulation and coding scheme level, generates channel state information based on the tracking result, and transmits the channel state information to the base station via an uplink.

According to yet another aspect of the present invention, there is provided an adaptive orthogonal frequency division multiple access system to transmit and receive data packets between a base station and a mobile station using an orthogonal frequency division multiplexing method. Channel state information is fed back to the base station via an uplink and comprises 2bits, one of which is a flag bit to track a MCS level in first and second tracking modes, the MCS level determining the state of a channel in a downlink.

BEST MODE FOR CARRYING OUT THE INVENTION

Figure 1A:
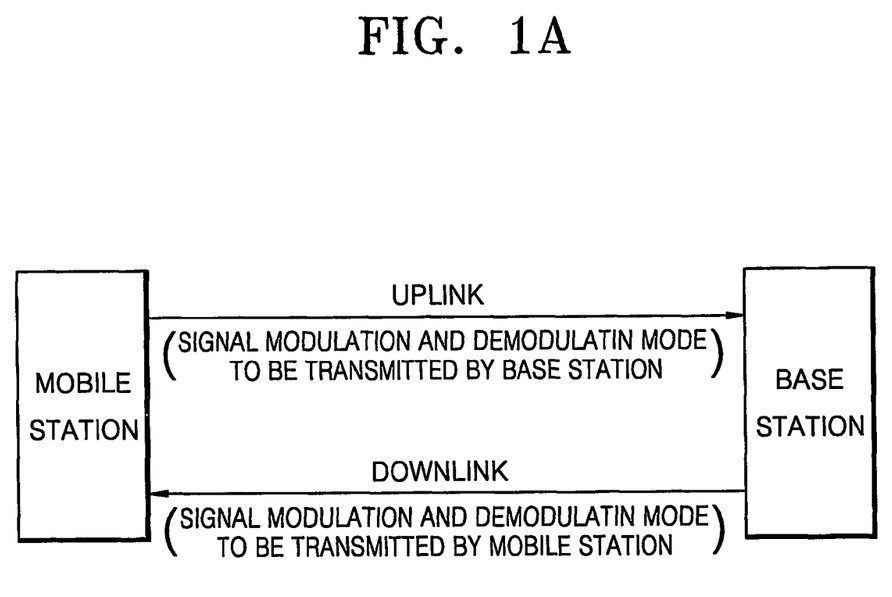
FIG. 1A is a block diagram for explaining a scenario of adaptive modulation and demodulation when a FDD is used.
Figure 1B:
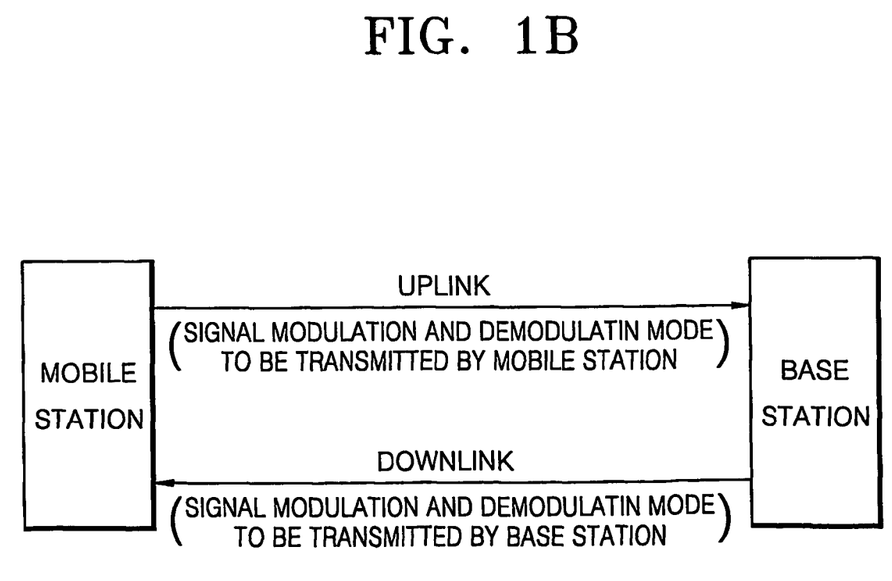
FIG. 1B is a block diagram for explaining a scenario of adaptive modulation and demodulation when a TDD is used.

FIG. 1A is a block diagram for explaining a scenario of adaptive modulation and demodulation when an FDD is used, and FIG. 1B is a block diagram for explaining a scenario of adaptive modulation and demodulation when a TDD is used.

Referring to FIGS. 1A and 1B, an MS measures the state of data downlink and requests a transmitter of a base station (BS) to transmit data in a transmission mode according to the state of downlink. The BS measures the state of uplink and requests a transmitter of the MS to transmit data in a transmission mode according to the state of uplink.

As shown in FIG. 1A, when the FDD is used, an uplink is used for signaling a modulation and demodulation mode to be used for a transmission by the BS, and a downlink is used for signaling a modulation and demodulation mode to be used for a transmission by the MS.

Referring to FIG. 1B, when the TDD is used, the uplink is used for signaling a modulation and demodulation mode to be used for a transmission by the MS, and the downlink is used for signaling a modulation and demodulation mode to be used for a transmission by the BS.

Figure 2:
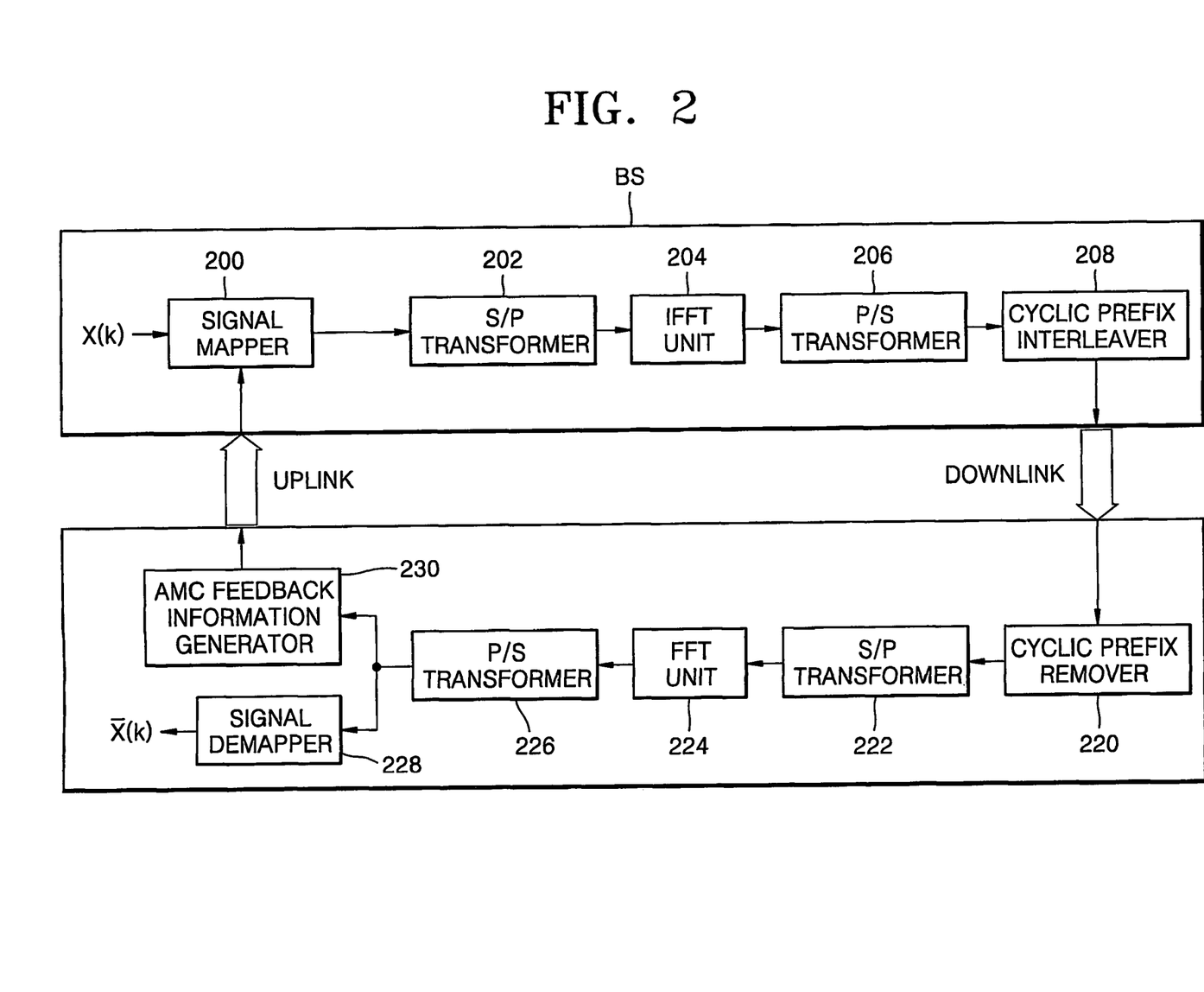
FIG. 2 is a block diagram showing the structure of a general OFDMA system.

FIG. 2 is a block diagram of a general adaptive OFDMA system. Referring to FIG. 2, the OFDMA system includes an MS and a BS. The BS includes a signal mapper 200, a serial-to-parallel (S/P) transformer 202, an inverse fast Fourier Transform (IFFT) unit 204, a parallel-to-serial (PS) transformer 206, and a cyclic prefix interleaver 208.

The signal mapper 200 maps an input signal X(k) to a quadrature phase shift keying (QPSK) signal or a quadrature amplitude modulation (QAM) signal in response to channel estimation information and MCS level information input from an MS.

The S/P transformer 202 serves as a preprocessor for IFFT and transforms the serial QPSK sequence or the serial QAM sequence output from the signal mapper 200 into a parallel QPSK sequence or a parallel QAM sequence.

The IFFT unit 204 carries input QAM symbols over a plurality of orthogonal sub-carriers to transform the input QAM symbols into a time based OFDM signal.

The P/S transformer 206 transforms the parallel OFDM signal output from the IFFT unit 204 into a serial OFDM signal.

The cyclic prefix interleaver 208 cyclically expands the serial OFDM symbols output from the P/S transformer 206. More specifically, in order to prevent interference among sub-carriers, the cyclic prefix interleaver 208 interleaves cyclic prefixes into guard intervals of the serial OFDM signal such that the OFDM symbols are cyclically expanded. Here, the cyclic prefixes are replicas of a portion of the OFDM signal. The OFDM signal with the cyclic prefixes undergoes a frequency shift and is transmitted via an antenna.

When the MS receives the OFDM signal from the BS, the OFDM signal is input to a signal demapper 228 and an AMC feedback information generator 230 via a cyclic prefix remover 220, an S/P transformer 222, an FFT unit 224, and a P/S transformer 226. The AMC feedback information generator 230 estimates the state of a downlink channel, determines an MCS level, and transmits the CSI including the MCS level information to the BS.

A method of reducing feedback CSI in an adaptive OFDMA system, according to a preferred embodiment of the present invention, and the structure and operation of the adaptive OFDMA system will now be described in detail with reference to the attached drawings.

The present invention is based on two concepts, i.e., packet-based data communication and sub-band- and feedback packet period-based data communication. In other words, data is packeted and the data packet is transmitted, and a predetermined number of sub-carriers in each sub-band are carried at a predetermined frequency.

The present invention provides a method of reducing feedback CSI during transmission and receipt of data packets between a BS and an MS adopting an adaptive OFDM scheme using AMC.

The adaptive OFDM scheme guarantees high spectral efficiency. In order to realize the adaptive OFDM scheme, CSI of each sub-carrier should be fed back via an uplink.

Two requirements must be satisfied to realize AMC which is adopted to transmit a large amount of data using limited frequency sources. First, accurate measuring is the state of a channel. Next, signaling the CSI without time delay and errors.

The present invention is applied to very high-speed packet data communication, i.e., packet-based data communication characterized by concentrated transmission unlike continuously transmitted speech sound. Since only one packet is transmitted in the packet-based data communication, it is not necessary to feed back an MCS level.

Also, a determination is made, according to predetermined standards, as to whether the MCS level is fed back, i.e., whether AMC is on or off. For example, if there are a plurality of data packets and a data packet currently transmitted is not the last packet, the BS informs an MS that the MCS level is fed back, i.e., the AMC is on. The MS then only feeds back the MCS level when the AMC is on.

Figure 3:
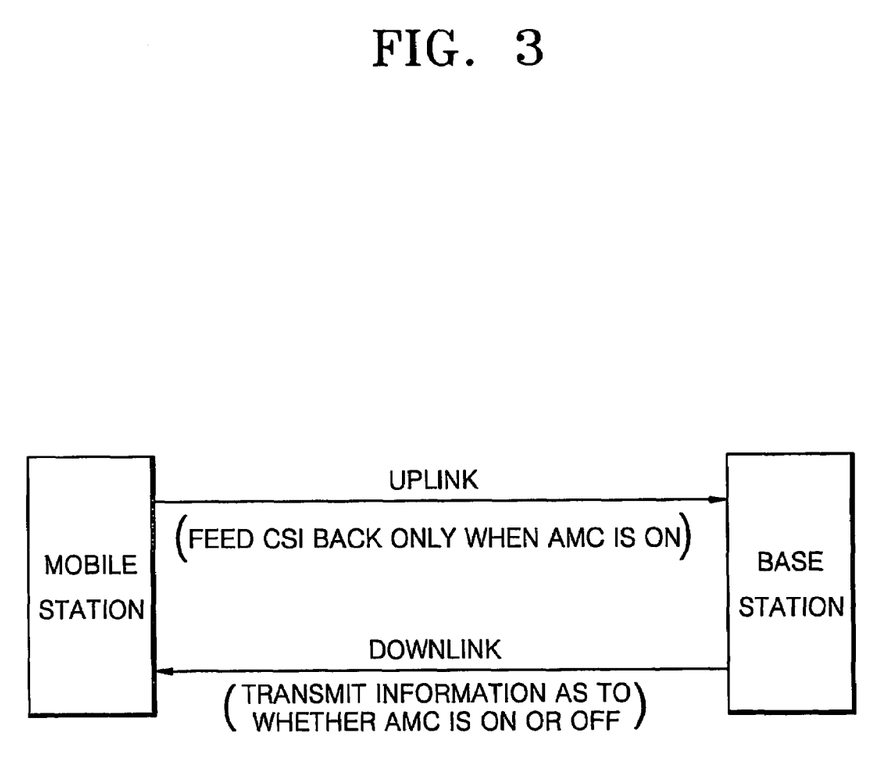
FIG. 3 is a block diagram for explaining a method of reducing feedback CSI in an adaptive OFDMA system, according to an embodiment of the present invention.

FIG. 3 is a block diagram for explaining a method of reducing feedback CSI in an adaptive OFDMA system, according to an embodiment of the present invention. Referring to FIG. 3, a BS transmits information regarding whether an MCS level is fed back, i.e., a data packet including information as to whether AMC is on or off, to an MS via a downlink. Using the information as to whether the AMC is on or off, the MS tracks the MCS level only when the AMC is on and then feeds back CSI obtained from the tracking of the MCS level to the BS via an uplink.

Here, whether the AMC is on or off may be determined depending on whether at least two or more data packets are sequentially transmitted via the downlink. When one data packet is transmitted, the AMC is off. Whether the AMC is on or off may also be determined depending on whether the last data packet is currently transmitted via the downlink. When the last data packet is transmitted, the AMC is off. The AMC may be turned on and off at a predetermined frequency, such that each period contains a predetermined number of data packets to be fed back. Accordingly, since the MCS level is fed back only in indispensable cases, a waste of resources of internal arithmetic units of a system and channel resources can be reduced in the OFDMA system.

The AMC may be performed when CSI is fed back over each sub-band including a group of a predetermined number of sub-carriers. Thus, the feedback CSI is reduced with a decrease in the number of sub-carriers of one group. For example, if each group includes eight sub-carriers, feedback CSI is reduced to ⅛. When AMC is applied to OFDMA, feedback CSI may include information on sub-bands allocated to each MS, i.e., each user, in a downlink. In this case, users may be individually identified and the resources of the sub-bands may be flexibly allotted to MS so as to meet a demand for distinct Quality of Service (QoS) from separate MSs.

OFDMA is a modification of OFDM and is to provide individual users with a portion of available sub-carriers to enable multiple access. In the OFDMA, the BS allocates an optimum sub-band of a plurality of sub-bands to a user according to the state of a channel of the MS. This is referred to as a dynamic channel allocation technique. In the dynamic channel allocation technique, the number and the positions of sub-bands vary each time the sub-bands are allocated to the user. Thus, it is effective to feed back information on all of sub-carriers. For example, the information on the sub-carriers may be fed back at the predetermined frequency via an allocated feedback sub-frame.

Therefore, the BS should pre-inform the MS of whether CSI is fed back over each sub-band every predetermined feedback period of time. Here, each sub-band is pre-determined by grouping a predetermined number of sub carriers, maintaining coherent bandwidth. Also, the predetermined feedback period refers to a period of data packet over which CSI is transmitted. The predetermined feedback period is pre-determined in consideration of a coherent time for which a channel environment does not vary.

When the AMC is on, information on a feedback period, the size of a sub-band, etc. together with the information regarding whether the AMC is on should be downlinked from the BS to the MS.

Figure 4A:
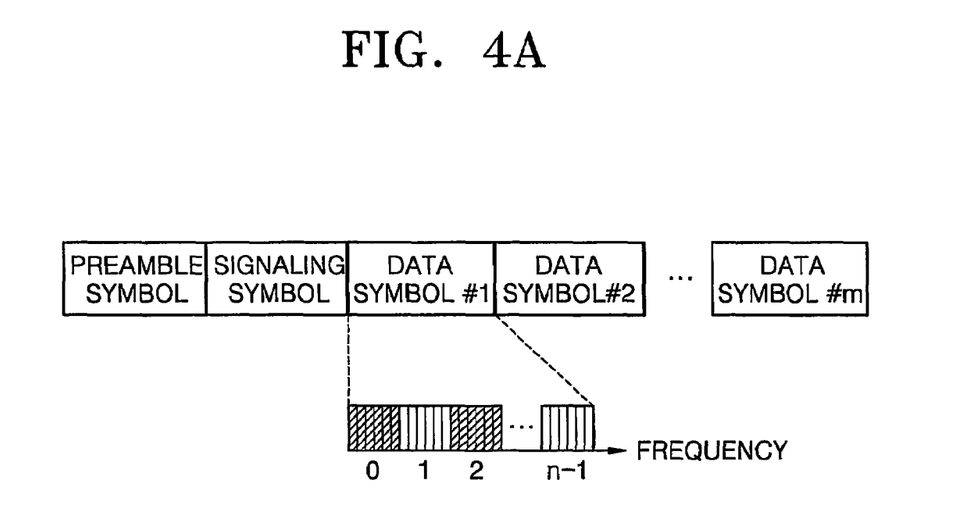
FIG. 4A is a block diagram showing the structure of a downlink frame in an adaptive OFDMA system, according to an embodiment of the present invention.
Figure 4B:
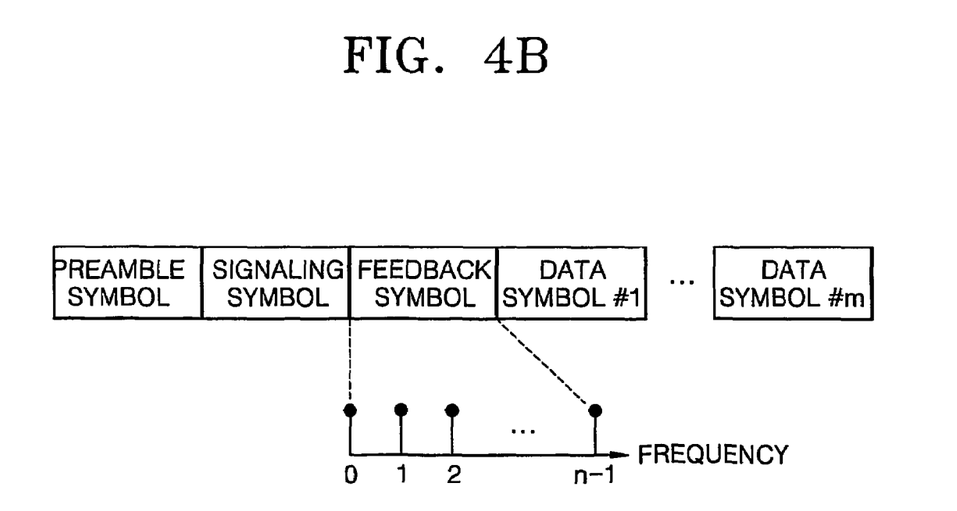
FIG. 4B is a block diagram showing the structure of an uplink frame in an adaptive OFDMA system, according to an embodiment of the present invention.

FIGS. 4A and 4B are block diagrams for explaining an adaptive OFDMA frame structure. FIG. 4A shows a downlink frame structure including a preamble symbol, a signalling symbol, and m data symbols. Each of the m data symbols includes n sub-bands.

Referring to FIG. 4A, the preamble symbol refers to a training sequence which is used for an MS to perform automatic gain control (AGC), symbol timing recovery, channel estimation, and so forth.

The signalling symbol refers to information on the number of sub-carriers to be grouped based on a coherent bandwidth. In other words, the signalling symbol is used to signal whether AMC is on or off, according to an MCS level, the total length of the all of data symbols, the position of a currently transmitted packet in a group of packets, and the like. For example, the signalling symbol is may include information for indicating that the AMC is on when a packet being transmitted matches a feedback period. Also, the signalling symbol may include information for indicating that the AMC is off when a packet being transmitted is the last period.

The m data symbols are a series of OFDM data symbols. Here, the length of each data symbol is determined in consideration of a coherent time.

FIG. 4B is a block diagram of an uplink frame structure including a preamble symbol, a signalling symbol, a feedback symbol, and m data symbols. Referring to FIG. 4B, the preamble symbol refers to a training sequence which is used to perform AGC, symbol timing recovery, channel estimation and so forth, of which a BS should be informed when transmitting an uplink packet.

The signalling symbol includes information on an MCS level and the entire length of the data symbols. An MS determines the MCS level by performing AMC.

The feedback symbol is used to obtain, from the signalling symbol, information as to whether AMC is on or off, determine the MCS level in each sub-band, and inform a BS of the determined MCS level so as to provide downlink AMC information. To be more specific, channel estimation is performed using the signalling symbol received via a downlink, a signal-to-noise ratio (SNR) is calculated based on the result of the channel estimation, and an MCS level suitable for each sub-band is determined and then inserted into the feedback symbol.

The m data symbols are a series of data symbols which are transmitted via an uplink.

Figure 5A:
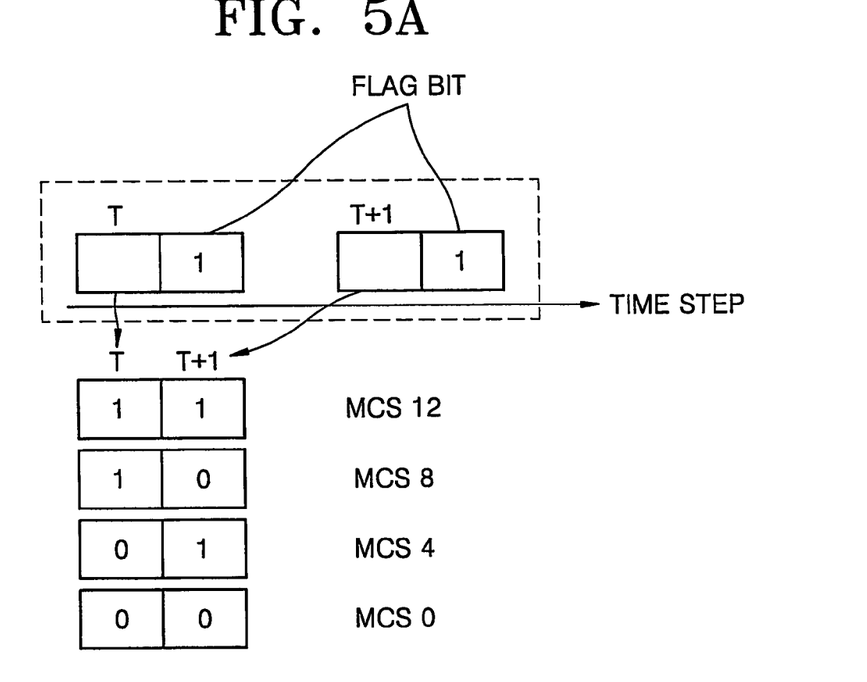
FIG. 5A is a view for explaining a rough MCS selection mode using 2 bits, according to an embodiment of the present invention.
Figure 5B:
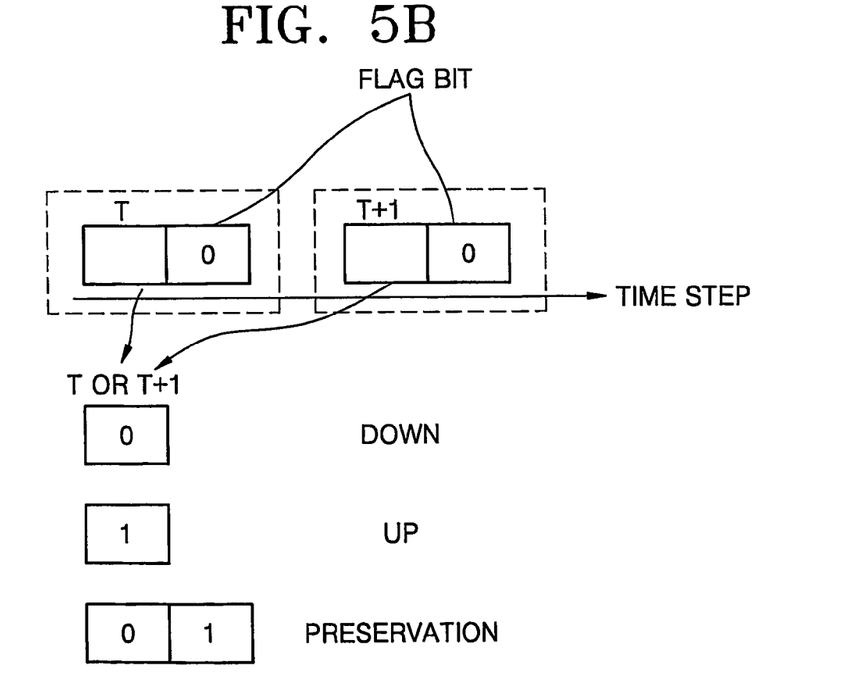
FIG. 5B is a view for explaining a fine MCS selection mode using 2 bits, according to an embodiment of the present invention.

FIGS. 5A and 5B are views for explaining a method of tracking an MCS level using 2 bits in a rough MCS selection mode and a fine MCS selection mode, respectively, according to a preferred embodiment of the present invention.

In the present invention, when the state of a channel in a downlink varies rapidly, an MCS level is tracked in a rough MCS selection mode. When the state of the channel in the downlink varies slowly, the MCS level is tracked in a fine MCS selection mode. Here, CSI includes 2 bits, one of which may be a flag bit to discern the rough MCS selection mode from the fine MCS selection mode.

When tracking of the MCS level starts after receiving a packet, as shown in FIG. 5A, one of MCS level 0, MCS level 4, MCS level 8, and MCS level 12 is rapidly selected in the rough MCS selection mode so as to quickly approach a desired MCS level. Next, as shown in FIG. 5B, the MCS level may be finely tracked up and/or down one by one. When the state of the channel varies rapidly during tracking of the MCS level, for example, when the MCS level fluctuates by three or more, the fine MCS selection mode is changed into the rough MCS selection mode.

A BS may track the MCS level from bit combinations of previous and current CSI. In other words, when 2 bits are allocated to feedback CSI at a time step, the BS may track the MCS level from bit combinations of two pieces of 2-bit-CSI at two consecutive time steps.

A preferred embodiment of a method of allocating 2 bits to CSI to track an MCS level will now be described.

In the present embodiment, the rough MCS selection mode and the fine MCS selection mode are executed so as to accurately reach a desired channel level.

Referring to FIG. 5A, an MCS level is tracked in the rough MCS selection mode so as to rapidly approach a target level. In other words, in the rough MCS selection mode, the MCS level is rapidly tracked by skipping over four levels, i.e., from MCS level 0 to MCS level 4, 8, or 12. Thereafter, the MCS level is tracked in the fine MCS selection mode so as to accurately approach the target level.

One of two bits of feedback CSI, i.e., a least significant bit (LSB) or a most significant bit (MSB), may be a flag bit used to select the rough MCS selection mode or the fine MCS selection mode. The other bit may be used to select the MCS level. As shown in FIGS. 5A and 5B, when the LSB is used as the flag bit, the MSB may be used to select the MCS level. As can be seen in FIG. 5A, when the LSB is "1", the rough MCS selection mode is selected. As shown in FIG. 5B, when the LSB is "0", the fine MCS selection mode is selected.

For convenience sake, let us assume that when 2 bits are "01" at time step T, "11" at time step T+1, and "10" at time step T+2, (T, T+1)=(01, 11), (T+1, T+2)=(11, 10), LSB(T)=1, LSB(T+1)=1, LSB(T+2)=0, MSB(T, T+1)=(0, 1), and MSB (T+1, T+2)=(1, 0).

Referring to FIG. 5A, when LSB(T)=1, the rough MCS selection mode is selected. When LSB(T)=0, the fine MCS selection mode is selected. When (T, T+1)=(01, 01), both LSBs have a value of "1", and thus the rough MCS selection mode is selected and MSB(T, T+1)=(0, 0). As a result, MCS level 0 is selected. However, the first incoming CSI, "01" may independently indicate MCS level 0, and "11" may independently indicate MCS level 8. In the rough MCS selection mode, MSB(T, T+1)=(0, 0), (0, 1), (1, 0), or (1, 1) indicates MCS levels 0, 4, 8, or 12, respectively. This means that (T, T+1)=(01, 01), (01, 11), (11, 01), or (11, 11). T="01" indicates the preservation of MCS level at a previous time step.

Referring to FIG. 5B, When LSB(T)=0, the MCS level is tracked in the fine MCS selection mode. When (T, T+1)=(00, 10), "10" indicates that the MCS level is tracked up one level, "00" indicates that the MCS level is tracked down one level, and "01" indicates that the MCS level remains the same.

Figure 6:
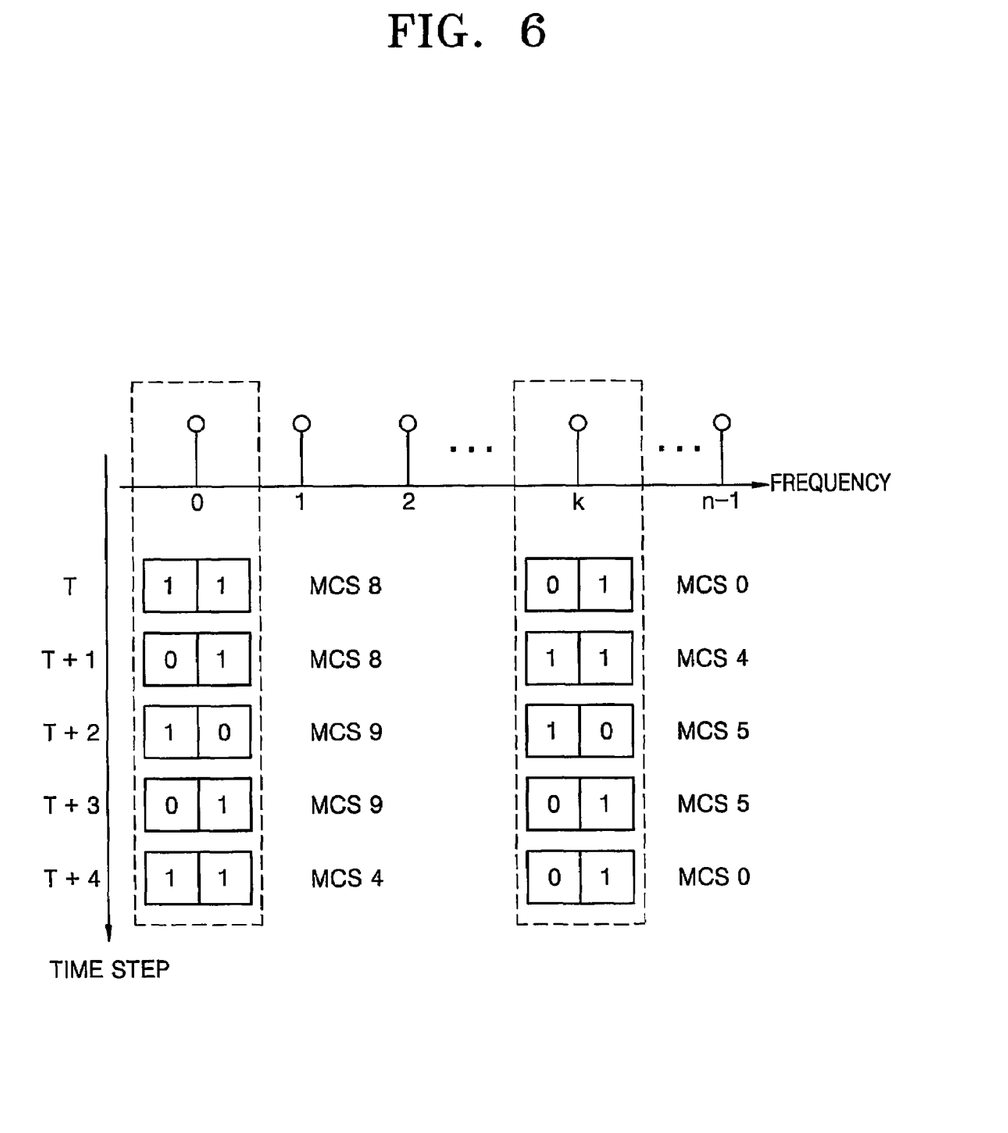
FIG. 6 is a view for explaining a method of selecting an MCS level with variations in a time step in an adaptive OFDMA system, according to an embodiment of the present invention.

FIG. 6 is a view for explaining a method of selecting an MCS level according to time steps, in accordance with an embodiment of the present invention. Referring to FIG. 6, time steps T through T+4 in a $0^{th}$ sub band will be described. In the beginning T="11" independently indicates MCS level 8. Since T+1="01" independently indicates the preservation of a current MCS level, MCS level 8 is preserved. T+2="10" indicates that the MCS level is tracked up one level in the fine MCS selection mode. Thus, T+2="10" indicates MCS level 9. Since T+3="01" indicates the preservation of a previous MCS level, T+3="01" indicates MCS level 9. Since (T+3, T+4)=(01, 11), the MCS level is tracked in the rough MCS selection mode. Since MSB(T+3, T+4)=(0, 1), MCS level 4 is selected.

The time steps T through T+4 in a $k^{th}$ sub band will now be explained. Since T="01", MCS level 0 is selected. Next, since T+1="11", MSB(T, T+1)=(0, 1), MCS level 4 is selected. Since T+2="10" indicates that the MCS level is tracked up one level in the fine MCS selection mode, MCS level 5 is selected in the time step T+2. Since T+3="01" indicates that MCS level remains at a previous time step, MCS level 5 is preserved in the time step T+3. Since T+4="01", MSB(T+3, T+4)=(0, 0). Therefore, MCS level 0 is selected at the time step T+4.

Figure 7:
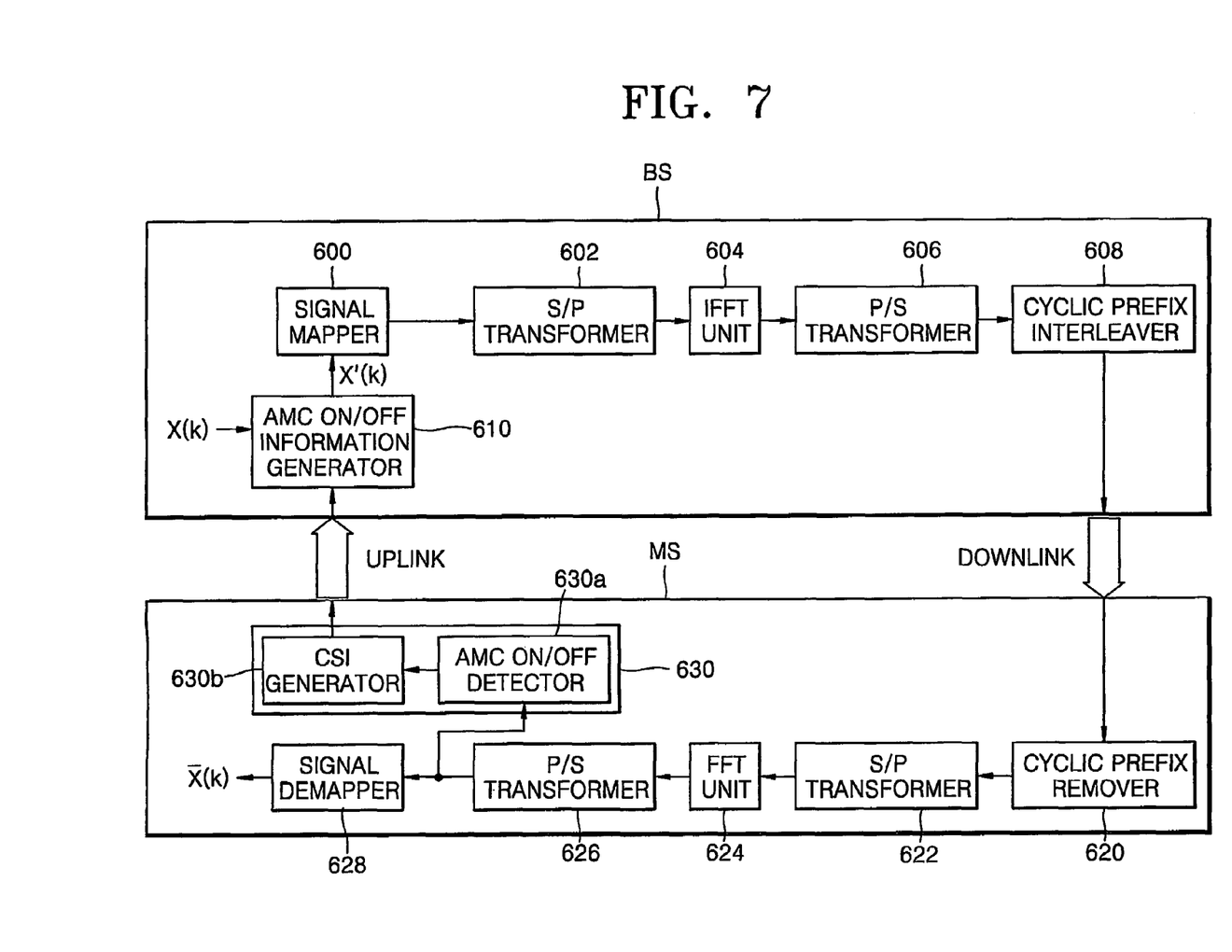
FIG. 7 is a block diagram of an adaptive OFDMA, according to an embodiment of the present invention.

FIG. 7 is a block diagram of an adaptive OFDMA system according to an embodiment of the present invention. Referring to FIG. 7, the adaptive OFDMA system includes a BS and an MS. The BS includes an AMC ON/OFF information generator 610, a signal mapper 600, a S/P transformer 602, an IFFT unit 604, a P/S transformer 606, and a cyclic prefix interleaver 608.

The AMC ON/OFF information generator 610 generates and outputs a signal X'(k) including information as to whether AMC is on or off, with reference to CSI received from the MS and an input signal X(k). Here, the CSI includes information on estimation of a channel in a downlink and an MCS level.

The signal mapper 600 maps the signal X'(k) to a QPSK signal or a QAM signal.

The S/P transformer 602, the IFFT unit 604, the P/S transformer 606, and the cyclic prefix interleaver 608 perform the same functions as the S/P transformer 202, the IFFT unit 204, the P/S transformer 206, and the cyclic prefix interleaver 208 of FIG. 2.

When the MS receives an OFDM signal from the BS, the OFDM signal is input to a demapper 628 and an AMC feedback information generator 630 via a cyclic prefix remover 620, a S/P transformer 622, an FFT unit 624, and a P/S transformer 626. The AMC feedback information generator 630 estimates the state of the channel in the downlink depending on whether AMC is on or off, determines an MCS level, and transmits the CSI over AMC feedback information to the BS. For this purpose, the AMC feedback information generator 630 includes an AMC ON/OFF detector 630a and a CSI generator 630b.

Whether the AMC is on or off may be determined depending on whether at least two or more data packets are sequentially transmitted via the downlink. Whether the AMC is on or off may also be determined depending on whether a packet being transmitted via the downlink is the last packet. The AMC may be turned on and off at a predetermined frequency such that a predetermined number of data packets are fed back in each period.

The AMC may be performed in each sub-band including a group of a predetermined number of sub-carriers.

As described with reference to FIGS. 5A, 5B, and 6, unlike in the prior art, only 2 bits are used for CSI. Also, the 2-bit CSI is generated by the CSI generator 630b and fed back to the BS.

In summary, when the state of a channel in a downlink varies rapidly, an MCS level is tracked in a rough MCS selection mode. When the state of the channel in the downlink varies slowly, the MCS level is tracked in a fine MCS selection mode. Here, the CSI includes 2 bits, one of which may be a flag bit used to distinguish the rough MCS selection mode from the fine MCS selection mode. The MCS level may also be tracked using bit combinations of previously received CSI and currently received CSI.

In an adaptive OFDMA system according to the present invention, AMC may be performed in each sub-band or may not. The structure of a data packet transmitted from a BS to an MS via a downlink and the structure of a data packet transmitted from the MS to the BS via an uplink are as described with reference to FIGS. 4A and 4B.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

As described above, in a method of reducing feedback CSI in an adaptive OFDMA system according to the present invention and the adaptive OFDMA system, feedback CSI used for AMC can be reduced. Also, when AMC is performed, unnecessary processes can be omitted to reduce the waste of resources of internal logic units and a channel.

What is claimed is:

1. A method of reducing channel state information fed back in an adaptive orthogonal frequency division multiple access system when transmitting and receiving data packets between a base station and a mobile station using an orthogonal frequency division multiplexing method comprising adaptive modulation and coding, the method comprising:
    transmitting a data packet comprising information as to whether adaptive modulation and coding is on or off from the base station to the mobile station via a downlink; and
    tracking a modulation and coding scheme level only when it is determined that adaptive modulation and coding is performed based on the information as to whether adaptive modulation and coding is on or off and feeding back the channel state information obtained from a tracking result from the mobile station to the base station via an uplink.

2. The method of claim 1, wherein whether adaptive modulation and coding is on or off is determined depending on whether at least two or more data packets are sequentially transmitted via the downlink.

3. The method of claim 2, wherein whether adaptive modulation and coding is on or off is determined depending on whether the last data packet has been transmitted via the downlink.

4. The method of claim 1, wherein whether adaptive modulation and coding is turned on or off is determined so that adaptive modulation and coding is on at a predetermined feedback period.

5. The method of claim 1, wherein adaptive modulation and coding is performed in each sub-band including a group of a predetermined number of sub-carriers.

6. The method of claim 1, wherein the channel state information comprises 2 bits, one of which is a flag bit used to track a modulation and coding scheme level in a first tracking mode and a second tracking mode, to determine the state of a channel in the downlink.

7. The method of claim 6, wherein the first tracking mode is a rough modulation and coding scheme selection mode which is performed if the state of the channel in the downlink varies rapidly, and the second tracking mode is a fine modulation and coding scheme selection mode which is performed if the state of the channel in the downlink varies slowly.

8. The method of claim 6, wherein the modulation and coding scheme level is tracked from bit combinations of previously received channel state information and current channel state information.

9. The method of claim 1, wherein the data packet transmitted from the base station to the mobile station via the downlink comprises:
    a preamble symbol comprising a training sequence used to perform automatic gain control, symbol timing recovery, and channel estimation in the mobile station;
    a signaling symbol comprising information on a modulation and coding scheme level, information on the total length of all data symbols, and information on whether adaptive modulation and coding is on or off, the information on the modulation and coding scheme level being transmitted from the base station after modulation and coding is performed; and
    a series of data symbols used in the downlink.

10. The method of claim 5, wherein the data packet transmitted from the base station to the mobile station via the downlink comprises:
    a preamble symbol comprising a training sequence used to perform automatic gain control, symbol timing recovery, and channel estimation in the mobile station;
    a signaling symbol comprising information on the number of sub-carriers to be grouped based on a coherent bandwidth and information on a modulation and coding scheme level, information on the total length of all data symbols, and the information as to whether adaptive modulation and coding is on or off, the information on the modulation and coding scheme level being transmitted from the base station after modulation and coding is performed; and
    a series of data symbols used in the downlink.

11. The method of claim 1, wherein the data packet transmitted from the mobile station to the base station via the uplink comprises:
    a preamble symbol comprising a training sequence used to perform automatic gain control, symbol timing recovery, and channel estimation in the base station;
    a signaling symbol comprising information on a modulation and coding scheme level and the total length of all data symbols, the information on the modulation and coding scheme level being transmitted from the mobile station after modulation and coding is performed;
    a feedback symbol comprising information on a modulation and coding scheme level determined in each sub-band when it is determined that adaptive modulation and coding is to be performed based on the information on as to whether adaptive modulation and coding is on or off; and
    a series of data symbols used in the uplink.

12. The method of claim 5, wherein the data packet transmitted from the mobile station to the base station via the uplink comprises:
    a preamble symbol comprising a training sequence used to perform automatic gain control, symbol timing recovery, and channel estimation in the base station;
    a signaling symbol comprising information on a modulation and coding scheme level and the total length of all data symbols, the information on the modulation and coding scheme level being transmitted from the mobile station after modulation and coding is performed;

a feedback symbol comprising information on a modulation and coding scheme level determined in each sub-band when it is determined that adaptive modulation and coding is to be performed based on the information on as to whether adaptive modulation and coding is on or off; and a series of data symbols used in the uplink.

13. A method of reducing feedback channel state information in an adaptive orthogonal frequency division multiple access system when transmitting and receiving data packets between a base station and a mobile station using an orthogonal frequency division multiplexing method comprising adaptive modulation and coding, wherein the channel state information is fed back to the base station via an uplink and comprises 2 bits, one of which is a flag bit to track a modulation and coding scheme level in first and second tracking modes, the modulation and coding scheme level determining the state of a channel in a downlink, and wherein the first tracking mode is a rough modulation and coding scheme selection mode which is performed if the state of the channel in the downlink varies rapidly, and the second tracking mode is a fine modulation and coding scheme selection mode which is performed the state of the channel in the downlink varies slowly.

14. The method of claim 13, wherein the modulation and coding scheme level is tracked from bit combinations of previous channel state information and current channel state information.

15. An adaptive orthogonal frequency division multiple access system to transmit and receive data packets between a base station and a mobile station using an orthogonal frequency division multiplexing method, the adaptive orthogonal frequency multiple access system comprising:

the base station comprising an AMC ON/OFF information generator that generates data packets comprising information as to whether adaptive modulation and coding is on or off; and the mobile station comprising AMC feedback information generator that, when it is determined, based on the information as to whether adaptive modulation and coding is on or off, that adaptive modulation and coding is on, estimates the state of a channel in a downlink, tracks a modulation and coding scheme level, generates channel state information based on a tracking result, and transmits the channel state information to the base station via an uplink.

16. The adaptive orthogonal frequency division multiple access system of claim 15, wherein whether adaptive modulation and coding is on or off is determined depending on whether the last data packet has been transmitted via the downlink.

17. The adaptive orthogonal frequency division multiple access system of claim 15, wherein whether adaptive modulation and coding is on or off is determined depending on whether the last data packet has been transmitted via the downlink.

18. The adaptive orthogonal frequency division multiple access system of claim 15, wherein whether adaptive modulation and coding is turned on or off is determined so that adaptive modulation and coding is on at a predetermined feedback period.

19. The adaptive orthogonal frequency division multiple access system of claim 15, wherein adaptive modulation and coding is performed in each sub-band including a group of a predetermined number of sub-carriers.

20. The adaptive orthogonal frequency division multiple access system of claim 15, wherein the channel state information comprises 2 bits, one of which is a flag bit used to track a modulation and coding scheme level in two selection modes, i.e., a first tracking mode and a second tracking mode, to determine the state of a channel in the downlink.

21. The adaptive orthogonal frequency division multiple access system of claim 20, wherein the first tracking mode is a rough modulation and coding scheme selection mode which is performed if the state of the channel in the downlink varies rapidly, and the second tracking mode is a fine modulation and coding scheme selection mode which is performed if the state of the channel in the downlink varies slowly.

22. The adaptive orthogonal frequency division multiple access system of claim 20, wherein the modulation and coding scheme level is tracked from bit combinations of previously received channel state information and current channel state information.

23. The adaptive orthogonal frequency division multiple access system of claim 15, wherein the data packet transmitted from the base station to the mobile station via the downlink comprises:

a preamble symbol comprising a training sequence used to perform automatic gain control, symbol timing recovery, and channel estimation in the mobile station;

a signaling symbol comprising information on a modulation and coding scheme level, information on the total length of all data symbols, and information on whether adaptive modulation and coding is on or off, the information on the modulation and coding scheme level being transmitted from the base station after modulation and coding is performed; and a series of data symbols used in the downlink.

24. The adaptive orthogonal frequency division multiple access system of claim 19, wherein the data packet transmitted from the base station to the mobile station via the downlink comprises:

a preamble symbol comprising a training sequence used to perform automatic gain control, symbol timing recovery, and channel estimation in the mobile station;

a signaling symbol comprising information on the number of sub-carriers to be grouped based on a coherent bandwidth and information on a modulation and coding scheme level, information on the total length of all data symbols, and the information as to whether adaptive modulation and coding is on or off, the information on the modulation and coding scheme level being transmitted from the base station after modulation and coding is performed; and a series of data symbols used in the downlink.

25. The adaptive orthogonal frequency division multiple access system of claim 15, wherein the data packet transmitted from the mobile station to the base station via the uplink comprises:

a preamble symbol comprising a training sequence used to perform automatic gain control, symbol timing recovery, and channel estimation in the base station;

a signaling symbol comprising information on a modulation and coding scheme level and the total length of all data symbols, the information on the modulation and coding scheme level being transmitted from the mobile station after modulation and coding is performed;

a feedback symbol comprising information on a modulation and coding scheme level determined in each sub-band when it is determined that adaptive modulation and coding is to be performed based on the information on as to whether adaptive modulation and coding is on or off; and a series of data symbols used in the uplink.

26. The adaptive orthogonal frequency division multiple access system of claim 19, wherein the data packet transmitted from the mobile station to the base station via the uplink comprises:
- a preamble symbol comprising a training sequence used to perform automatic gain control, symbol timing recovery, and channel estimation in the base station;
- a signaling symbol comprising information on a modulation and coding scheme level and the total length of all data symbols, the information on the modulation and coding scheme level being transmitted from the mobile station after modulation and coding is performed;
- a feedback symbol comprising information on a modulation and coding scheme level determined in each subband when it is determined that adaptive modulation and coding is to be performed based on the information on as to whether adaptive modulation and coding is on or off; and
- a series of data symbols used in the uplink.

27. An adaptive orthogonal frequency division multiple access system to transmit and receive data packets between a base station and a mobile station using an orthogonal frequency division multiplexing method,
- wherein the channel state information is fed back to the base station via an uplink and comprises 2 bits, one of which is a flag bit to track a modulation and coding scheme level in first and second tracking modes, the modulation and coding scheme level determining the state of a channel in a downlink, and
- wherein the first tracking mode is a rough modulation and coding scheme selection mode which is performed if the state of the channel in the downlink varies rapidly, and the second tracking mode is a fine modulation and coding scheme selection mode which is performed if the state of the channel in the downlink varies slowly.

28. The adaptive orthogonal frequency division multiple access system of claim 27, wherein the modulation and coding scheme level is tracked from bit combinations of previous channel state information and current channel state information.

* * * * *